(12) United States Patent  
Chiu et al.

(10) Patent No.: US 7,922,942 B2
(45) Date of Patent: Apr. 12, 2011

(54) INJECTION MOLD DESIGN, METHOD FOR IN-MOLD COATING OF LENSES, AND COATED LENSES

(75) Inventors: Hao-Wen Chiu, Palm Harbor, FL (US); Matthew Lockwood, Bradenton, FL (US); Wilfred Houle, Largo, FL (US)

(73) Assignee: Essilor International (Compagnie Generale d'Optique), Charenton (FR)

( * ) Notice: Subject to any disclaimer, the term of this patent is extended or adjusted under 35 U.S.C. 154(b) by 164 days.

(21) Appl. No.: 12/329,294

(22) Filed: Dec. 5, 2008

(65) Prior Publication Data

US 2010/0140819 A1    Jun. 10, 2010

(51) Int. Cl.
*B29D 11/00* (2006.01)
(52) U.S. Cl. .......... 264/2.7; 264/1.32; 264/1.7; 264/2.5; 264/2.6; 427/162; 427/164
(58) Field of Classification Search .................. 264/1.7, 264/2.7, 2.5, 1.9, 1.32, 2.6, 267, 269; 425/90, 425/95, 96, 97, 808; 249/114.1; 359/359, 359/576, 582, 900; 427/162, 164
See application file for complete search history.

(56) References Cited

U.S. PATENT DOCUMENTS

| 4,251,474 A | * | 2/1981 | Blandin | 264/1.1 |
| 5,067,800 A | | 11/1991 | Shirakawa | |
| 5,674,283 A | * | 10/1997 | Stoy | 623/5.11 |
| 6,733,701 B2 | * | 5/2004 | Gross et al. | 264/2.5 |
| 7,028,974 B1 | * | 4/2006 | Chiba | 249/114.1 |
| 2004/0099971 A1 | * | 5/2004 | Su et al. | 264/1.32 |

FOREIGN PATENT DOCUMENTS

| JP | 07017729 A | * | 1/1995 |
| WO | 9423929 | | 10/1994 |

OTHER PUBLICATIONS

English Abstract and English machine translation of JP 07017729, retrieved Jul. 26, 2010 from JPO database.*
Examiner D. Bibollett-Ruche; International search Report; Mar. 19, 2010; European Patent Office, Rijswijk; 9 pages.

* cited by examiner

*Primary Examiner* — Joseph S Del Sole
*Assistant Examiner* — Timothy Kennedy
(74) *Attorney, Agent, or Firm* — Keusey & Associates, P.C.

(57) ABSTRACT

A method and apparatus for coating lenses within an injection molding machine having a concave optical insert with a perimeter edge that meets the receiver ring in an annular contact region. A channel is formed throughout the annular contact region. When molding a lens with the apparatus, and according to the method, a closed-loop coating containment lip is formed by the channel. After the lens has solidified and the mold is opened, a predetermined volume of coating solution is applied and the mold is re-clamped. A uniformly thin layer of coating is cured on to the convex lens surface by avoiding coating run off and preventing mold contamination.

13 Claims, 3 Drawing Sheets

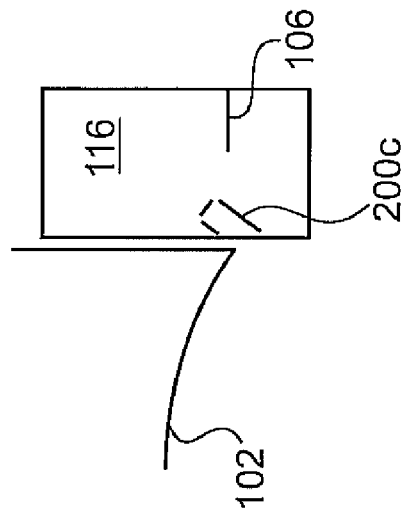
FIG. 5A  FIG. 5B  FIG. 5C
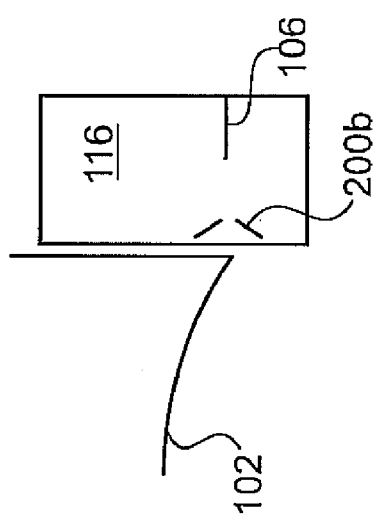
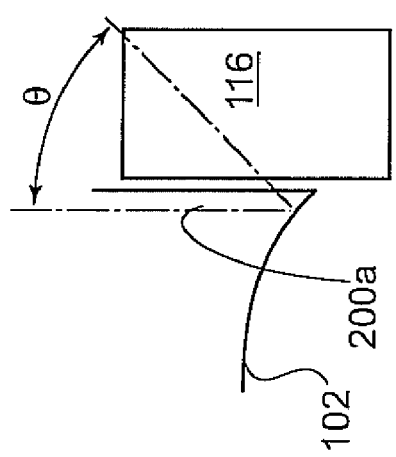
FIG. 6A  FIG. 6B  FIG. 6C
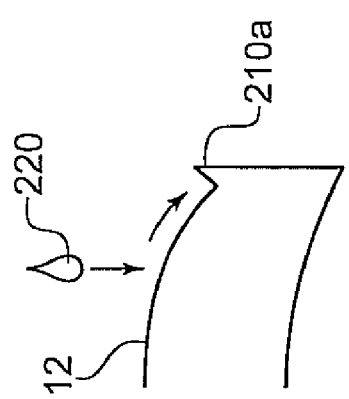

INJECTION MOLD DESIGN, METHOD FOR IN-MOLD COATING OF LENSES, AND COATED LENSES

BACKGROUND OF THE INVENTION

1. Field of the Invention

The invention relates to an injection mold design, a method for in-mold coating of lenses, and the resulting coated lenses.

2. The Prior Art

The methods for coating an injection molded article in situ have been disclosed widely and are commonly referred to as the "in-mold coating" process. Typically, in-mold coating involves injecting coating solution directly into a closed cavity or opening the mold to apply the coating solution on to the just molded parts. Both methods suffer from a common problem, in that coating solution tends to leak out of the mold cavity. This leakage affects the coverage and thickness of the coating on the target part surface. The leaked coating solution may damage the mold as the coating cures along the parting line.

U.S. Published Patent Application 2003/0077425 and U.S. Published Patent Application 2003/0082344 both describe a closed-mold direct coating process, in which a thin coating containment flange is provided around the perimeter of the molded article. The flange prevents the coating from leaking or seeping off the desired surface and out of the mold cavity. The shrinkage of the flange was much smaller than the rest of the part, because the flange is thinner. As a result, the resistance to coating flow was much higher at the flange, which minimized coating leakage.

The Prior Art describes molding one product, like a plaque, where the center-gated mold has been customized for a singular application. In the manufacture of ophthalmic lenses, injection molds are edge-gated and require frequent changes of lens inserts. Accordingly, the solutions of the prior art would not be suitable for providing uniformly thin coatings on a variety of lenses. Hence, it would be desirable to provide a method and apparatus to prevent coating solution from leaking out of a lens molding cavity in order to make an in-mold lens coating process practical.

SUMMARY OF THE INVENTION

Therefore, it is an object of the present invention to provide an injection mold suitable for in-mold coating of lenses.

It is a further object of the present invention to present a method of coating injection molded lenses in situ.

It is another object of the present invention to control the volume of the coating pool on the surface to be coated.

It is yet a further object of the present invention to provide a method and apparatus that can be used with different inserts and different lens thicknesses.

It is still another object of the present invention to provide a uniformly thin, optical quality coating for in-mold coated lenses.

It is still a further object of the present invention to contain the coating solution and prevent contamination of the injection molding machine.

These and other related objects according to the invention are achieved by a method of coating lenses in an injection molding machine. The injection molding machine is equipped with a concave optical insert having a peripheral edge that meets the receiver ring in an annular contact region. Initially, we provide a molding cavity with a channel formed throughout the annular contact region. A lens is injection molded within the cavity whereby a coating containment lip is formed by the channel at the lens periphery. A coating solution is then dispensed on to the lens so that the lip contains the coating during coating application spread.

A predetermined volume of coating solution is dispensed to insure lip containment so that a uniformly thin coating layer is provided across the entire lens surface. Another benefit is to insure lip containment so that coating run off is avoided to prevent contamination of the mold.

The channel is formed with an open cross-sectional geometry, to allow the injection molding machine to open with the insert and receiver cleanly pulling away from the lens and the lip. The channel forms an interior wall of the lip at an angle from greater than 0 degrees to 90 degrees. The lip has a height in the range of 0.25 mm to 10 mm, and preferably between 1.0 and 3.0 mm. Following the injection molding step, the molding machine opens and the coating solution is dispensed and coating application spread is achieved by closing the molding machine.

The channel is at least partially formed in the peripheral edge of the concave optical insert. For example, the channel is formed by chamfering the peripheral edge of the concave optical insert. Alternatively, or in addition, the channel is at least partially formed in the receiver. The channel may be formed within two receiver rings and spans the parting line. The channel may be formed by grooving or chamfering at least one of the receiver rings.

Another aspect of the invention consists of a coated optical lens made according to the above method. Preferably, the resulting product is a coated optical bifocal lens made from polycarbonate.

A further aspect of the invention consists of an apparatus for use with an injection molding machine for in-mold coating of optical lenses. The apparatus includes a concave optical insert having a part-forming surface with a peripheral edge. A receiver ring surrounds the insert and meets the peripheral edge in an annular contact region. A channel is formed throughout the annular contact region thereby forming a closed loop. A dispenser applies a coating solution to the formed lens, after it has solidified to a point where the mold can be opened without deforming the lens.

The concave optical insert has a bifocal part-forming surface. The concave optical insert is removable. The channel is formed in the receiver ring so that standard concave optical inserts can be removably inserted into the molding machine to form optical lenses having a coating containment lip. Typically, two receiver rings are provided, one for the movable mold side and one for the stationary mold side. An edge gate delivers molten thermoplastic material through one of the receiver rings to the part-forming surface and the channel. The channel is formed as a V-groove or chamfer in one of the receiver rings. The A parting line is disposed between the receiver rings, wherein the channel is disposed between the part-forming surface and the parting line. The channel comprises a cross-sectional shape of open geometry so that the injection molding machine can open cleanly at the parting line. The channel is oriented at an angle from greater than 0 degrees to 90 degrees. The channel has a depth in the range of 0.25 mm to 10 mm.

Another aspect of the invention is a coated optical lens made with the above noted apparatus. Preferably, the resulting product is a coated optical bifocal lens made from polycarbonate.

BRIEF DESCRIPTION OF THE DRAWINGS

The advantages, nature, and various additional features of the invention will appear more fully upon consideration of the illustrative embodiments now to be described in detail in connection with accompanying drawings. In the drawings wherein like reference numerals denote similar components throughout the views:

FIGS. 5A, 5B and 5C are a series of views showing channel locations.

FIGS. 6A, 6B and 6C are a series of views showing containment lip configurations.

DETAILED DESCRIPTION OF THE PREFERRED EMBODIMENTS

Figure 1:
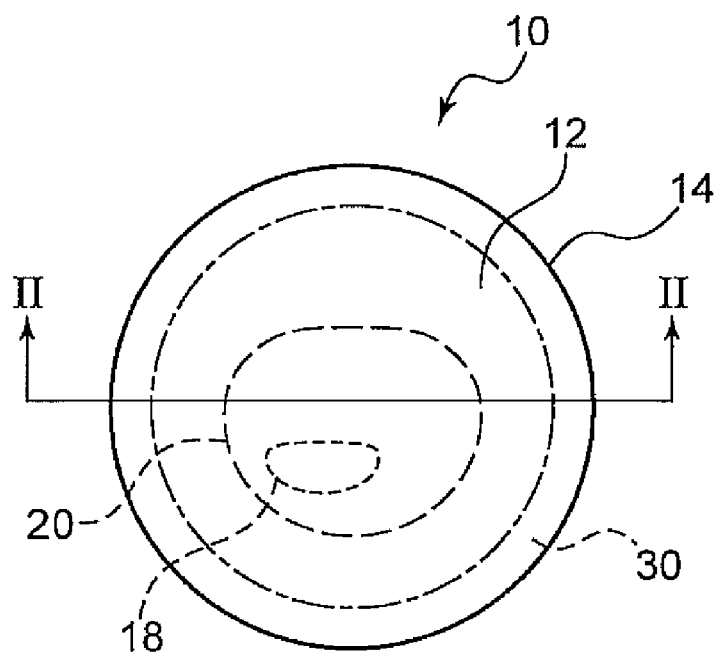
FIG. 1 is a top plan view of an optical lens.
Figure 2:
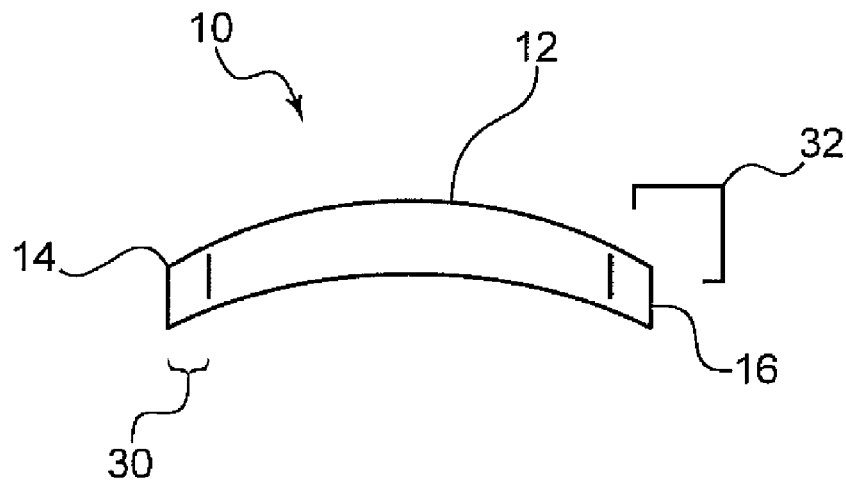
FIG. 2 is a cross-sectional view of FIG. 1 taken along the line II-II.

Referring now in detail to the drawings, and in particular, FIGS. 1 and 2, there is shown a top plan view of an optical lens 10, for example an ophthalmic lens. The surface of the lens facing out of the page is the upper convex lens surface 12. The outer perimeter 14 of convex lens surface 12 forms a corner, beyond which is the lens side surface 16.

Lenses may be formed by injection molding a suitable thermoplastic lens material. An exemplary list of such thermoplastics includes polycarbonate, polyamide, polyimide, polysulfone, copolymers of polyethyleneterephthalate and polycarbonate, polyolefine, homopolymers and copolymers of diethylene glycol bis(allylcarbonate), homopolymers and copolymers of (meth)acrylic monomers, homopolymers and copolymers of thio(meth)acrylic monomers, homopolymers and copolymers of urethane, homopolymers and copolymers of thiourethane, epoxy homopolymers and copolymers, and episulfure homopolymers and copolymers. In a preferred embodiment the lens material is polycarbonate.

Suitable lens types are selected from ophthalmic lenses which may be afocal, single vision, semi-finished, sunglass, plano, unifocal, multi-focal, bifocal, bifocal straight top, trifocal, trifocal straight top, PAL, or a progressive lens. The preferred lens type is a bifocal lens.

Figure 3:
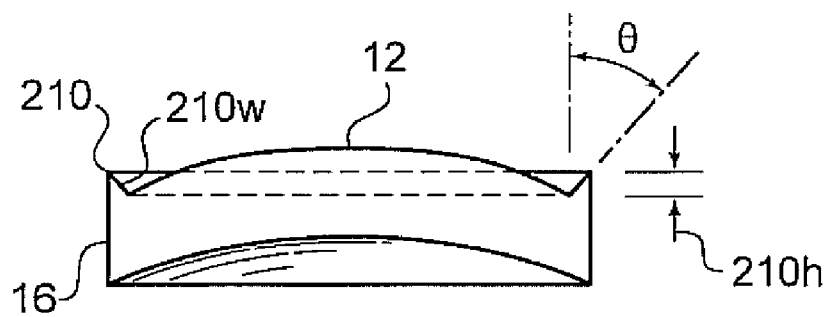
FIG. 3 is a similar cross-sectional view showing an embodiment of the containment lip according to the invention.

Optical lenses are manufactured in various powers and with optional features, for example, a straight top bifocal feature 18. The manufactured lens is known as a lens blank which comes in standard diameters, for example 76 mm. The lens blank is edged along a line 20 in order to fit a particular frame. The lens blank and edging process are configured to provide a narrow waste zone 30 along outer perimeter 14. For example, waste zone may include about 5 mm adjacent the outer perimeter 14. FIG. 2 shows waste zone 30 in a cross sectional view. Also shown is a lens periphery 32, which comprises a region completely within waste zone 30. Outer perimeter 14 is included within lens periphery 32. A portion of side surface 16 is also included within lens periphery 32. FIG. 3 shows a lens resulting from the inventive process and apparatus. A containment lip 210 is formed within the waste zone 30 to facilitate in situ coating, without interfering with conventional lens processing steps like edging, which removes the waste zone.

Figure 4:
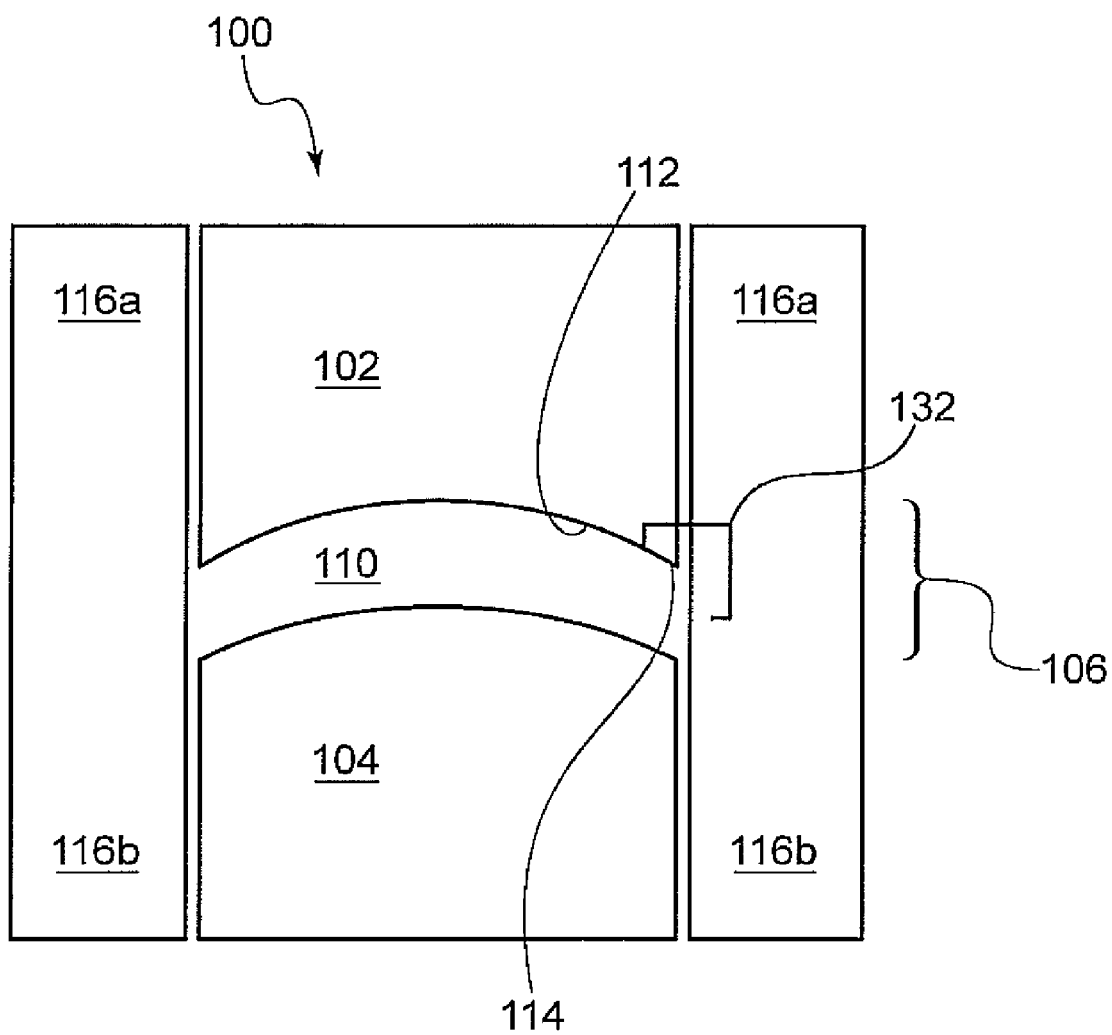
FIG. 4 is a schematic diagram of an injection molding machine.

As can be seen in FIG. 4, injection molding machine 100 includes various parts that correspond to lens features, as follows:

A lens molding cavity 110 is provided to form optical lens 10.

A removable concave insert 102 includes a part-forming surface 112 that forms convex lens surface 12. A further removable convex insert 104 is also provided.

Receiver rings 116a and 116b surround the inserts and form lens side surface 16. The receiver rings meet along a parting line 106.

Part-forming surface 112 and receiver ring meet at a perimeter edge 114 that corresponds to outer perimeter 14.

A peripheral, annular contact region 132 corresponds to lens periphery 32.

According to the inventive method, optical lenses are coated within molding machine 100 by providing a molding cavity 110 which has been modified by the addition of a channel formed throughout the peripheral, annular contact region 132. The channel is continuous and forms a closed loop, analogous to a moat surrounding part forming surface 112. The channel can be formed by a variety of methods including chamfering and V-grooving. In one embodiment the channel is formed by chamfering the perimeter edge 114. In a second embodiment, the channel is V-grooved and/or chamfered in one receiver ring, or in both receiver rings in a location that spans the parting line.

At the beginning of the cycle the mold is closed and a lens is injection molded within the cavity whereby a coating containment lip is formed by the channel. The lip is also continuous and forms a closed loop. The mold is opened and a coating solution is dispensed onto the convex lens surface within the lip. The mold is closed a second time to spread the coating across the convex lens surface. The lip is dimensioned to contain the coating as a pool until it can be spread in a uniformly thin layer across the entire lens surface. The formulations of the coating solution along with parameters for its cure, can be found in U.S. Published Patent Applications 2007/0138667 and U.S. Published Patent Applications 2007/0138665.

In conjunction with the dimensions of the lip, the coating solution is dispensed in a predetermined volume. Accordingly, enough coating is provided to evenly cover the lens, while at the same time, insuring that coating will not escape the containment lip which can lead to mold contamination. Coating that cures along the parting line can damage the mold.

Post injection in-mold coating experiments were conducted using an Engel ES700H 150 US ton vertical injection molding machine equipped with a 2-cavity side-entry mold. An acrylate based coating (a subset of the coatings disclosed in the published patent applications cited above) was used to coat the lenses residing in the cavities.

Example I

Two 6.50-base 2.00-add bifocal concave inserts having a 1.5 mm×45° chamfer on the top edge were used to mold semi-finished bifocal PC lenses, 76 mm in diameter and 9 mm in center thickness, with the following process parameters:

| | |
|---|---|
| Melt temperature: | 510° F. |
| Mold temperature: | 260° F. |
| Shot size: | 3.00 inch |
| Injection speed: | 0.1 inch/s |
| Packing pressure: | 800 psi |
| Hold time: | 100 seconds |
| Cooling time: | 4 minutes |
| Primary clamping force: | 150 tons |

At the end of cooling, the mold was opened to expose the convex surfaces of the just molded lenses. One drop, 0.15 grams, of the acrylate based coating was then dispensed onto the center of each lens using a syringe. Subsequently, a secondary clamping force of 150 tons (the same as the primary clamping force in this case) was applied to re-close the mold to spread out the coating evenly across the lens surfaces. After 1 minute, the mold was reopened to eject the lenses. The front (convex) surfaces of the resulting lenses were fully coated. And, there was no coating leaking out of the cavities.

Example II

The experiment described in example I was repeated using two 6.50-base 2.00-add bifocal concave inserts that did not have a chamfer on the top edge. Using the same amount of coating as in example I, the convex surfaces of the molded lenses were not fully coated. White coating flakes that adhered to the parting line were observed. These coating flakes were cured coating that leaked out of the cavities.

Example III

Two 5.50-base 2.00-add bifocal concave inserts having a 2.0 mm×45° chamfer on the top edge were used to mold semi-finished bifocal PC lenses, 76 mm in diameter and 8 mm in center thickness, with the same process parameters listed in Example I except:

| | |
|---|---|
| Shot size: | 2.60 inch |

Similar to example I, the front surfaces of the bifocal lenses were fully coated. And, there was no sign of coating leakage.

A series of further experiments were conducted with conditions similar to Example 1, with shot size adjusted for 2.25 base and 8.50 base lenses. The front surfaces were consistently coated with a uniformly thin layer at optical quality. There was no sign of coating leakage.

According to a further embodiment of the invention, there is provided an apparatus for use with an injection molding machine for in-mold coating of optical lenses. As can be seen in FIG. 4 a removable concave insert 102 has a part-forming surface 112 bounded by a perimeter edge 114. A receiver ring surrounds the insert and meets the perimeter edge in an annular contact region 132. A channel is formed throughout the annular contact region. The channel is continuous and forms a closed loop. The channel may be in the form of a chamfer, notch, V-groove or indentation. The particular configuration or cross-sectional shape of die channel is not critical, however the cross-sectional shape must be of open geometry and must be located within annular contact region 132.

The purpose of the channel is to form a lip on the molded lens which extends along the lens side surface 16 beyond the convex lens surface 12. FIG. 3 is a cross-sectional view similar to FIG. 2 showing a schematic illustration of tie lip, which is referred to generally as lip 210. To adequately coat a lens a predetermined volume of coating solution is specified. From that volume, one can estimate the amount of coating that might pool at the outer perimeter 14 of the lens. The containment lip will then be configured and dimensioned to contain such coating pool. The height 210h of the containment lip shall be between about 0.25 mm and about 10 mm. The preferred height is in the range of 1.0 to 3.0 mm. This lip height also corresponds to the channel depth. The interior wall 210w of the lip, that faces the convex lens surface 12 has a chamfer angle θ (theta) in the following range: greater than 0 degrees to 90 degrees. The preferred chamfer angle θ (theta) is in the range of about 5 degrees to about 85 degrees. The chamfer angle also corresponds to the angle of the channel.

FIGS. 5A, 5B and 5C show three examples of hardware modifications to form a channel which will result in the molded lip. FIG. 5A illustrates a chamfer 200a in the perimeter edge 114 of insert 102. FIG. 6A shows a segment of the corresponding lip 210a which will contain coating solution 220 when applied to convex lens surface 12. FIG. 5B illustrates a chamfer 200b in the receiver ring 116, for example one chamfer in receiver ring 116a and a second chamfer in receiver ring 116b. The resulting lip 210b, shown in FIG. 6B, spans parting line 106. The interior wall 210w is oriented vertically along the outside edge of insert 102. We refer to this as an outboard lip, i.e. the lip is outside of lens side surface 16. The angles for the chamfers 200b are not critical as long as they meet the general criteria set forth above. FIG. 5C illustrates a V-groove in receiver ring 116a and a chamfer in receiver ring 116b. The resulting lip 210c, shown in FIG. 6C, spans parting line 106. The interior wall 210w can be set at any angle within the θ (theta) range mentioned above as long as the lip height is within the 1 to 3 mm preferred height. The angles for the chamfers 200c are not critical as long as they meet the general criteria set forth above.

The embodiments of FIGS. 5B and 5C are intended to demonstrate a general principle of providing a channel in the receiver ring or rings, without requiring any modification of the concave insert 102. As a result, many different standard concave inserts can be installed into the modified receiver ring, to form a lens with a containment lip. Those inserts can then be exchanged into other unmodified receiver rings to mold standard lenses, for example, lenses which do not require in-mold coating.

The methods according to the invention describe an in situ coating process which can be effectively practiced by providing a channel within an annular contact region that boarders a lens molding cavity. The channel can be formed by chamfering, V-grooving or machining in various sizes and shapes. Channel forming is dictated by lip height requirements and an open geometry in the direction of mold opening. Coating solution is dispensed in a predetermined volume to provide a uniformly thin coating layer across the entire lens surface at optical quality, while avoiding run off. One embodiment allows conventional inserts to be freely exchanged into modified receivers to injection mold lenses with outboard containment lips.

The apparatus according to the invention provides injection mold parts that are modified to form a channel within an annular contact region. In a preferred embodiment the part forming surface is a bifocal lens part forming surface. The apparatus is used in conjunction with a coating dispenser that applies coating to the lens, after the mold opens. The annular contact region is located between the part forming surface and the parting line.

The in situ coated lens according to the invention comprises a thermoplastic lens and may be selected from various base curves and various lens types. In a preferred embodiment, the lens is made from polycarbonate and comprises a bifocal lens. The lens includes a containment lip that completely surrounds the convex lens surface. The containment lip is radially symmetrical, and is disposed between the coated surface and the lens side surface. The containment lip is designed for efficient in-mold coating, and configured to be completely removed by conventional edging, which is required to fit the lens to a selected frame.

Having described preferred embodiments for lens manufacturing processes, equipment used therein for molding and coating and the resulting coated lenses (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as outlined by the appended claims. Having thus described the invention with the details and particularity required by the patent laws, what is claimed and desired protected by Letters Patent is set forth in the appended claims.

What is claimed is:

1. A method of coating lenses in an injection molding machine having a concave optical insert with a perimeter edge that meets two receiver rings in an annular contact region, comprising the steps of:
   providing a molding cavity with a channel formed throughout the annular contact region, wherein the channel is formed within the two receiver rings and spans the parting line;
   injection molding a lens within the cavity whereby a coating containment lip is formed by the channel at the lens periphery; and
   dispensing a coating solution on to the lens so that the lip contains the coating during coating application spread.

2. The method of claim 1, wherein said dispensing step comprises: dispensing a predetermined volume of coating solution to insure lip containment so that a uniformly thin coating layer is provided across the entire lens surface.

3. The method of claim 1, wherein said dispensing step comprises: dispensing a predetermined volume of coating solution to insure lip containment so that coating run off is avoided to prevent contamination of the mold.

4. The method of claim 1, wherein the channel is formed with an open cross-sectional geometry to allow the injection molding machine to open, with the insert and receiver cleanly pulling away from the lens and the lip.

5. The method of claim 4, wherein the channel forms an interior wall of the lip at an angle from greater than 0 degrees to 90 degrees.

6. The method of claim 4, wherein the lip has a height in the range of 0.25 mm to 10 mm.

7. The method of claim 4, wherein following said injection molding step, the molding machine opens and the coating solution is dispensed; and wherein coating application spread is achieved by closing the molding machine.

8. The method of claim 1, wherein the concave optical insert is removable.

9. The method of claim 8, wherein the concave optical insert has a bifocal part-forming surface.

10. The method of claim 1, wherein the concave optical insert has a bifocal part-forming surface.

11. The method of claim 1, wherein the injection molding step comprises delivering molten thermoplastic material through an edge gate formed in one of the receiver rings.

12. The method of claim 1, wherein the channel is formed by grooving at least one of the receiver rings.

13. The method of claim 1, wherein the channel is formed by chamfering at least one of the receiver rings.

* * * * *